(12) United States Patent
Lin

(10) Patent No.: US 10,920,862 B2
(45) Date of Patent: Feb. 16, 2021

(54) ACTUATOR HAVING MANUAL ROTATING AND ANTI-PINCH MECHANISMS

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 113 days.

(21) Appl. No.: 16/511,178

(22) Filed: Jul. 15, 2019

(65) Prior Publication Data

US 2020/0378483 A1 Dec. 3, 2020

(30) Foreign Application Priority Data

May 27, 2019 (TW) .............................. 108206665 U

(51) Int. Cl.
*F16H 25/20* (2006.01)

(52) U.S. Cl.
CPC ....... *F16H 25/20* (2013.01); *F16H 2025/204* (2013.01); *F16H 2025/2065* (2013.01)

(58) Field of Classification Search
CPC ............... F16H 25/20; F16H 2025/204; F16H 2025/2065; F16H 2025/2071; Y10T 74/18576; Y10T 74/18696; Y10T 74/18752; Y10T 74/1526
See application file for complete search history.

(56) References Cited

U.S. PATENT DOCUMENTS

| 8,234,944 B2 * | 8/2012 | Lorenzen | B66C 23/48 74/89.38 |
| 9,074,668 B2 * | 7/2015 | Wu | A63B 21/0058 |
| 10,363,838 B2 * | 7/2019 | Runde | A63B 21/0058 |
| 2009/0133519 A1 * | 5/2009 | Lorenzen | F16H 25/2454 74/89.32 |
| 2018/0238426 A1 * | 8/2018 | Hung | F16H 25/2454 |

\* cited by examiner

*Primary Examiner* — Bobby Rushing, Jr.
(74) *Attorney, Agent, or Firm* — Chun-Ming Shih; HDLS IPR Services

(57) ABSTRACT

An actuator having a manual rotating mechanism and an anti-pinch mechanism includes an actuating body, a manual rotating mechanism, and an anti-pinch mechanism. The actuating body has a stretchable tube. The manual rotating mechanism has a sleeve assembly and a manual rotating wheel. The sleeve assembly has a central shaft and a connecting plate. The anti-pinch mechanism has a clutch wheel which is fixed to the stretchable tube and is movably sleeved around the central shaft. When the stretchable tube is blocked during a retraction stroke, the clutch wheel is detached from the connecting plate such that the clutch wheel follows the stretchable tube to idle. Therefore, the stretchable tube can be manually rotated to retract and the anti-pinch effect during the stretchable tube being retracted can be achieved.

10 Claims, 6 Drawing Sheets

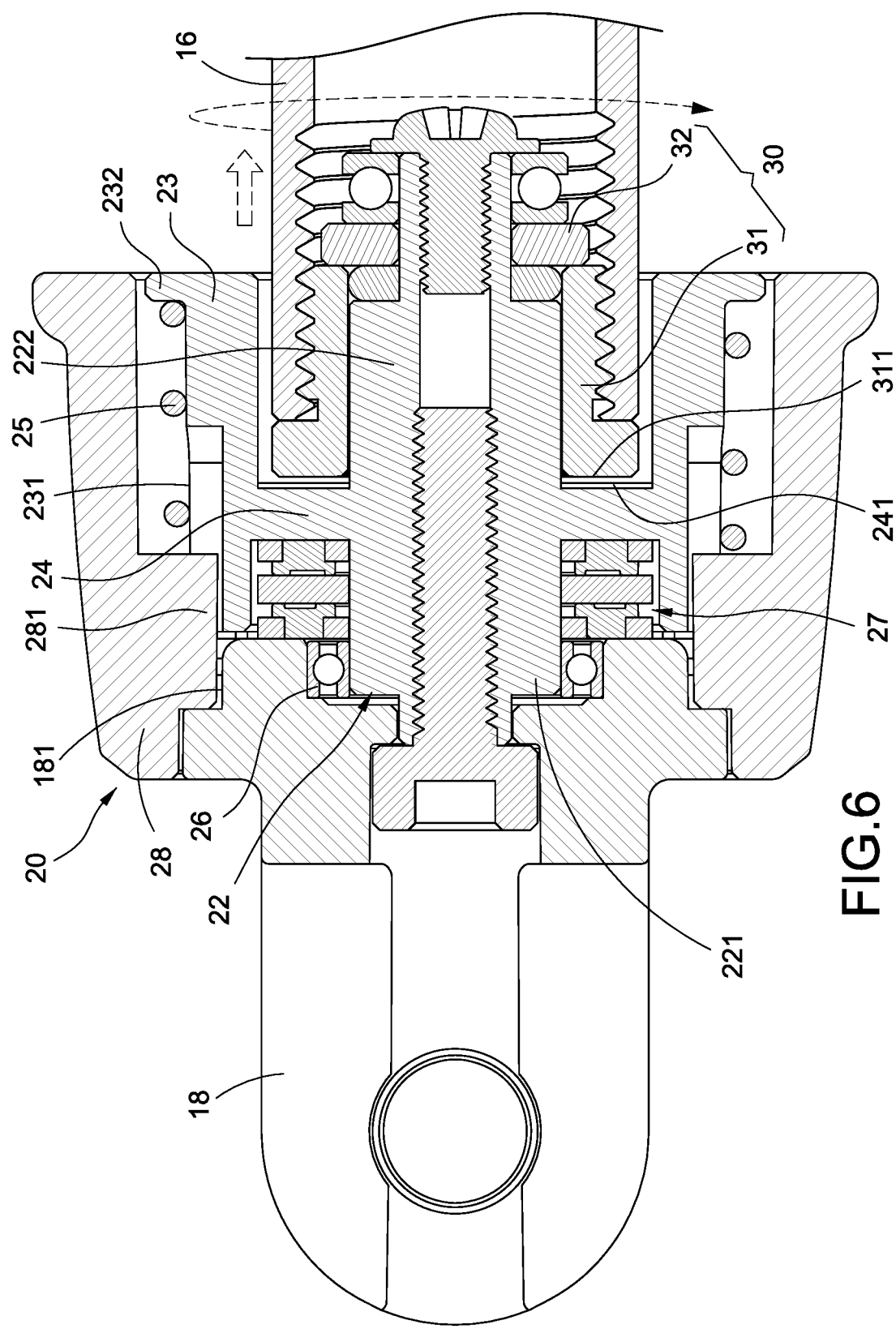

ACTUATOR HAVING MANUAL ROTATING AND ANTI-PINCH MECHANISMS

BACKGROUND OF THE INVENTION

Field of the Invention

The present invention relates to an actuator, in particular, to an actuator having a manual rotating mechanism and an anti-pinch mechanism.

Description of Related Art

The actuator mainly uses the driving components such as the motor, the worm, and the worm wheel to drive the leadscrew to rotate. At the same time, the leadscrew drives the stretchable tube screwed thereon to stretch or retract linearly. Because the structure and installation of the actuator are easier and more convenient than those of the pneumatic cylinder and the hydraulic cylinder, the actuator has been commonly used in various apparatuses such as the nursing beds, the electric chairs, the doors, and the windows, or in the field requiring the movements of stretch and retraction.

When the traditional actuator is used in the above-mentioned apparatuses, voltage drop or power shortage is inevitable during the motor operation and thus stops the motor operation. At this moment, only the actuator having the manual operation function can resolve and overcome the previous problem.

In addition, most of the traditional actuators use a front limit switch and a rear limit switch, both of which are disposed on the movement path of the nut of the stretchable tube. In this way, the nut is used to trigger the front limit switch and the rear limit switch during the screw transmission between the nut and the leadscrew, which effectively restricts the movement ranges of outward stretch or inward retraction.

However, when the traditional actuator is applied in the apparatuses such as the electric chairs, the electric windows, or the medical hangers, only two limit positions on the stretchable tube allow the nut to trigger the limit switches to stop the motor. When the nut moves within the middle range of the movement stroke, if a kid or user moves hands carelessly into the movement range, there is no safety mechanism to stop the motor and cause a pinch accident. Thus, this problem needs to be overcome.

SUMMARY OF THE INVENTION

It is an objective of the present invention to provide an actuator having a manual rotating mechanism and an anti-pinch mechanism, which can rotate to retract the stretchable tube manually and have an anti-pinch function during the retraction stroke of the stretchable tube.

In order to achieve the above objective, the present invention provides an actuator having a manual rotating mechanism and an anti-pinch mechanism. The actuator comprises an actuating body, a manual rotating mechanism, and an anti-pinch mechanism. The actuating body mainly has a leadscrew, a stretchable tube screwed to the leadscrew, and a front support. The manual rotating mechanism has a sleeve assembly and a manual rotating wheel. The sleeve assembly has a central shaft, a circular body surrounding the central shaft, and a connecting plate connected between the central shaft and the circular body. The front support is connected to one end of the central shaft. The manual rotating wheel is sleeved between the sleeve assembly and the front support and is operationally engaged with the circular body or the front support. The anti-pinch mechanism has a clutch wheel which is fixed to an end of the stretchable tube and is movably sleeved around the other end of the central shaft. When the stretchable tube is blocked during a retraction stroke, the clutch wheel is detached from the connecting plate such that the clutch wheel follows the stretchable tube to be idling.

The present invention also has the following effects. By means of the disposition of the stop ring, the separation of the clutch wheel from the second shaft section can be effectively prevented. Using a helical spring to be flexibly clamped between the manual rotating wheel and the stop annular portion can achieve the automatic replacement of the manual rotating wheel. By means of the dispositions of the radial bearing and the thrust bearing, the sleeve assembly can rotate with respect to the front support.

BRIEF DESCRIPTION OF DRAWING

FIG. 6 is an operational cross-sectional view of the clutch wheel detached from the manual rotating mechanism and following the stretchable tube to be idling.

DETAILED DESCRIPTION OF THE INVENTION

Figure 1:
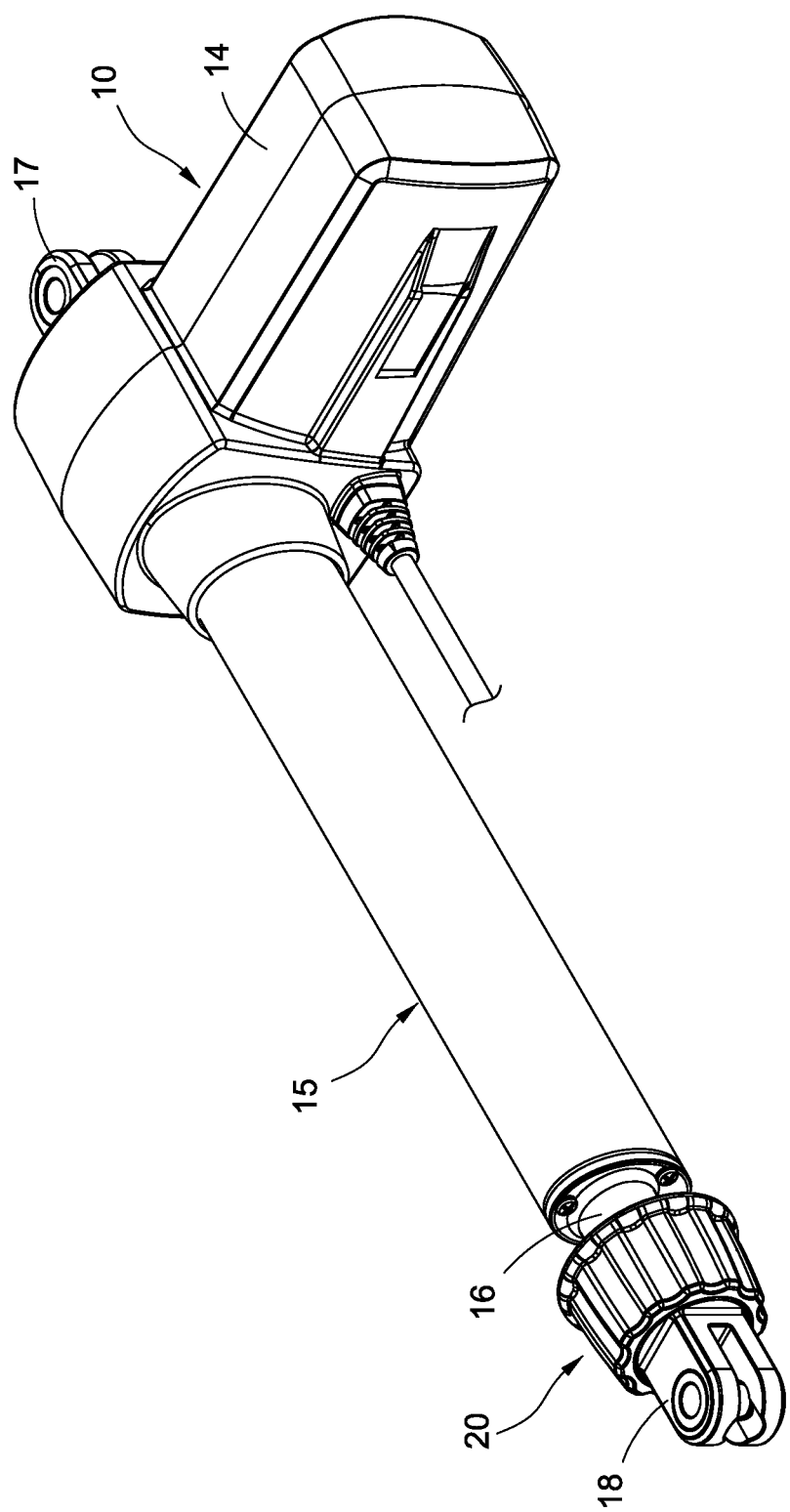
FIG. 1 is a perspective view of the actuator of the present invention.
Figure 2:
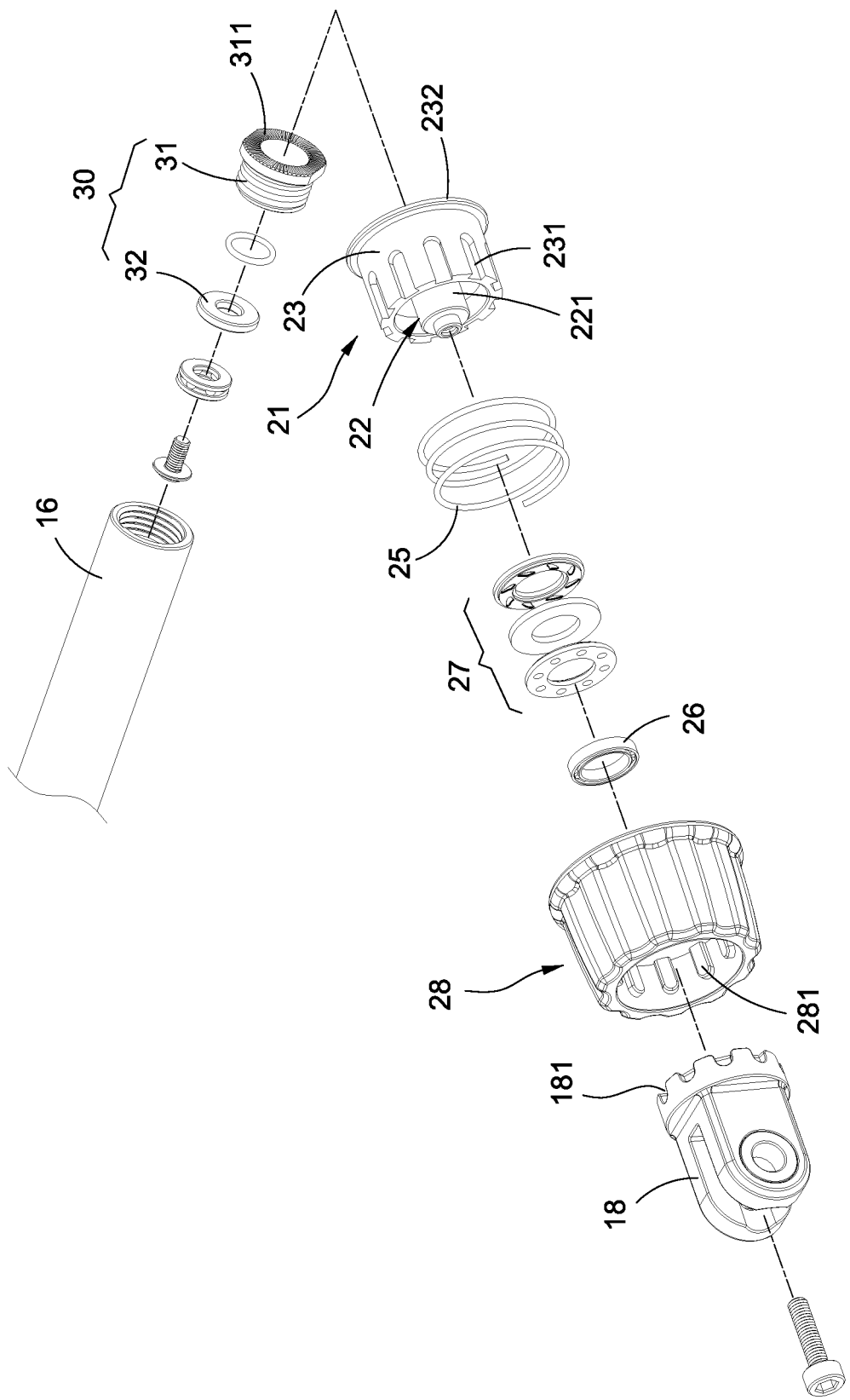
FIG. 2 is an exploded view of the manual rotating mechanism and the anti-pinch mechanism of the present invention.
Figure 3:
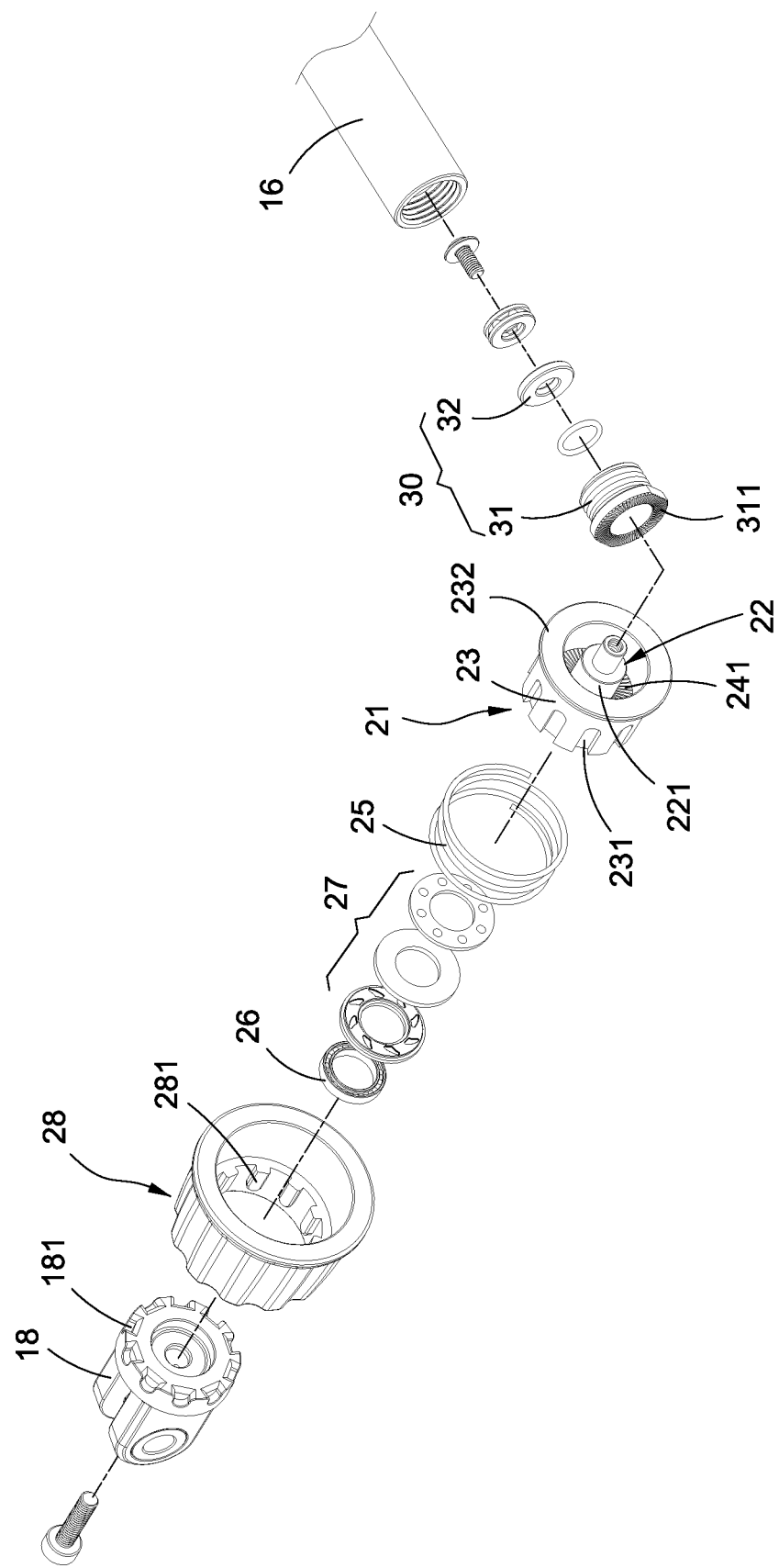
FIG. 3 is an exploded view of the manual rotating mechanism and the anti-pinch mechanism of the present invention from another view.
Figure 4:
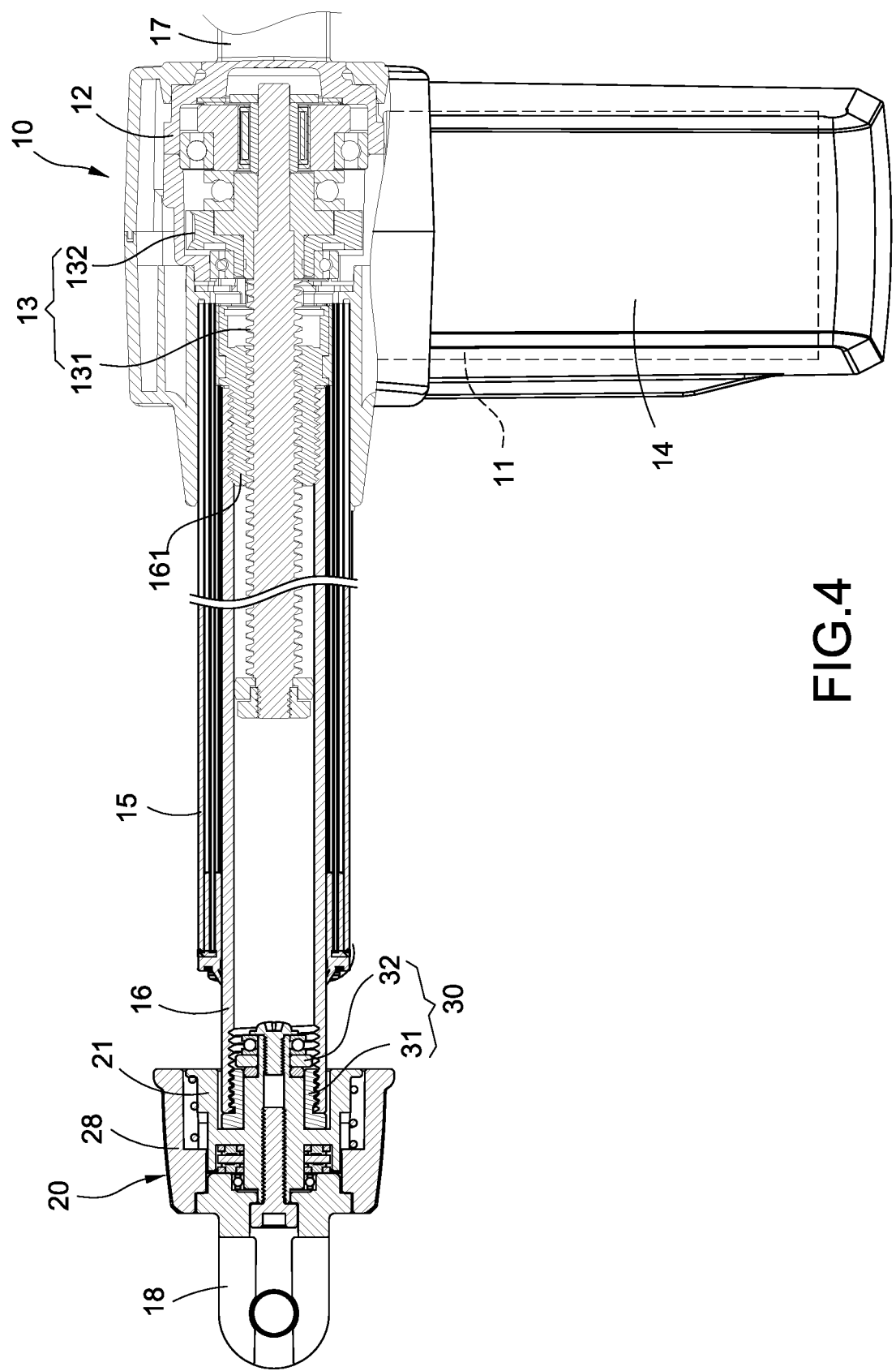
FIG. 4 is an assembled cross-sectional view of the actuator of the present invention.

To further disclose the characteristics and technical details of the present invention, please refer to the following detailed description and accompanying figures. However, the accompanying figures are only for reference and explanation, but not to limit the scope of the present invention.

Please refer to FIGS. 1-4. The present invention provides an actuator having a manual rotating mechanism and an anti-pinch mechanism. The actuator mainly comprises an actuating body 10, a manual rotating mechanism 20, and an anti-pinch mechanism 30.

The actuating body 10 mainly comprises a motor 11, a gear box 12, a transmission mechanism 13, a housing 14, an external tube 15, a stretchable tube 16, a rear support 17, a front support 18, and other components.

The motor 11 is connected to the gear box 12. The transmission mechanism 13 has a leadscrew 131. One end of the leadscrew 131 is supported together by plural bearings in the gear box 12 and performs the engaged transmission through the worm wheel 132 of the leadscrew 131 and the worm wheel (not shown) of the motor 11.

The housing 14 completely covers the motor 11 and the gear box 12. One end of the external tube 15 passes through the housing 14 and is disposed corresponding to the gear box 12; the other end of the external tube 15 extends away from the housing 14.

The stretchable tube 16 is inserted into the external tube 15 and is disposed annularly around the perimeter of the leadscrew 131. One end of the stretchable tube 16 is connected to the nut 161 which is screwed to the leadscrew 131 such that the stretchable tube 16 can be driven to stretch or retract linearly with respect to the external tube 15 through the rotation movement of the leadscrew 131.

The rear support 17 is fixed to the rear end of the gear box 12 and is exposed out of the housing 14. The front support 18 is connected to the end of the stretchable tube 16 away from the nut 161 through the manual rotating mechanism 20 and the anti-pinch mechanism 30.

The manual rotating mechanism 20 mainly comprises a sleeve assembly 21 and a manual rotating wheel 28. The sleeve assembly 21 mainly has a central shaft 22, a circular body 23, and a connecting plate 24. The central shaft 22 comprises a first shaft section 221 a second shaft section 222. The first shaft section 221 is formed in the left zone of the connecting plate 24; the second shaft section 222 is formed in the right zone of the connecting plate 24. The above-mentioned front support 18 is connected to the end of the first shaft section 221 through a bolt.

The circular body 23 is disposed surrounding the central shaft 22. Plural keyseats 231 are disposed on the outer surface of the circular body 23. The stop annular portion 232 extends from the bottom edge of the circular body 23. The connecting plate 24 is connected between the central shaft 22 and the circular body 23. The driven portion 241 is disposed at the side of the connecting plate 24 adjacent to the second shaft section 222. In the current embodiment, the driven portion 241 has a plurality of protruding teeth disposed radially.

The manual rotating wheel 28 is sleeved around the external perimeter of the sleeve assembly 21. Plural protrusions 281 are spaced on the inner wall surface of the manual rotating wheel 28. Besides, plural key grooves 181 are disposed at the end of the front support 18 facing the manual rotating wheel 28. The protrusions 281 are individually disposed corresponding to the respective keyseats 231 and the respective key grooves 181 such that the manual rotating wheel 28 can be operationally engaged with the respective key grooves 181 or the respective keyseats 231 through the protrusions 281 between the sleeve assembly 21 and the front support 18.

The manual rotating mechanism 20 further comprises a helical spring 25, a radial bearing 26, and a thrust bearing 27. The helical spring 25 is sleeved around the external perimeter of the circular body 23 and has two ends which are individually clamped flexibly between the manual rotating wheel 28 and the stop annular portion 232 of the circular body 23. The radial bearing 26 is clamped between the first shaft section 221 and the front support 18. The thrust bearing 27 is sleeved on the first shaft section 221 and is clamped between the front support 18 and the connecting plate 24.

The anti-pinch mechanism 30 mainly has a clutch wheel 31 which is fixed to an end of the stretchable tube 16 and is movably sleeved on the second shaft section 222 of the central shaft 22. An actuating portion 311 is disposed on the end surface of the clutch wheel 31 facing the connecting plate 24. In the current embodiment, the actuating portion 311 has a plurality of straight teeth disposed radially. The actuating portion 311 can be locked into the above-mentioned driven portion 241 to move together or can be detached from the driven portion 241 to rotate with the stretchable tube 16.

The anti-pinch mechanism 30 further comprises a stop ring 32 which is sleeved around and fixed to the end portion of the second shaft section 222. The gap A (refer to FIG. 5) is formed between the end surface of the clutch wheel 31 and the end surface of the stop ring 32 in which the stop ring 32 is used to prevent the clutch wheel 31 from detaching from the second shaft section 222.

Figure 5:
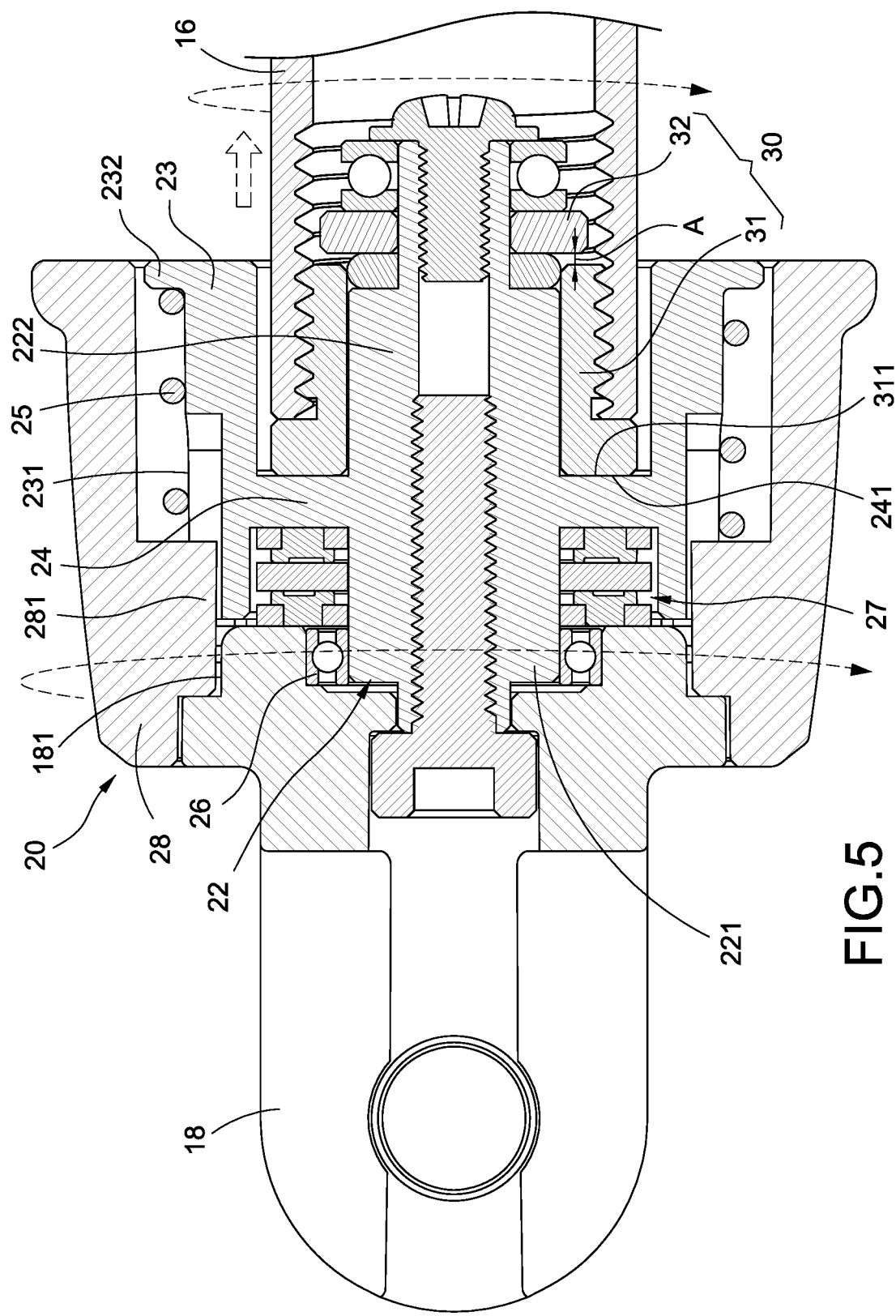
FIG. 5 is an operational cross-sectional view of the manual rotating mechanism and the stretchable tube of the present invention from another view.

Please refer to FIG. 5. When the actuator is applied in a medical hanger such as a cervical rehabilitation apparatus which has a hanger and a hanging arm (both not shown), the rear support 17 is fixed to the hanger and the front support 18 is connected to the hanging arm and remains still. It is unavoidable during the operation that voltage drop or power shortage happens and the motor 11 cannot operate. In this case, the user can move the manual rotating wheel 28 linearly towards the sleeve assembly 21 to make the protrusions 281 be individually engaged with the respective keyseats 231. After that, the user turns the manual rotating wheel 28 clockwisely. Because the actuating portion 311 of the clutch wheel 31 and the driven portion 241 of the connecting plate 24 are mutually locked, the rotation of the manual rotating wheel 28 will drive the sleeve assembly 21, the clutch wheel 31, and the stretchable tube 16 to rotate simultaneously. Meanwhile, the leadscrew 131 is restricted by the motor 11 and cannot rotate. In this way, the stretchable tube 16 can rotate to retract into the external tube 15 by means of the screw connection between the nut 161 on the stretchable tube 16 and the leadscrew 131.

Please refer to FIG. 6. When the actuator is applied in a medical hanger and operates during the ascending and descending movements, a sudden accident is quite inevitable to raise safety concerns. Thus, it is necessary to install the anti-pinch mechanism 30 in the actuator. While the motor 11 is operating, the leadscrew 131 is rotated through the transmission of the worm wheel 132 and worm such that the stretchable tube 16 can move outwards with respect to the external tube 15 by means of the screw connection between the nut 161 and the leadscrew 131. When the stretchable tube 16 is blocked during the retraction stroke (i.e., the manual rotating wheel 28 or the sleeve assembly 21 is blocked), the motor 11 keeps driving the leadscrew 131 to rotate with the manual rotating wheel 28 and the sleeve assembly 21 remaining stationary. At this moment, the actuating portion 311 of the clutch wheel 31 is detached from the driven portion 241 of the connecting plate 24 such that the clutch wheel 31 follows the stretchable tube 16 to be idling. On the contrary, after the blockage is removed, the manual rotating wheel 28 and the sleeve assembly 21 move towards the stretchable tube 16; the driven portion 241 of the connecting plate 24 is locked into the actuating portion 311 of the clutch wheel 31 again; the manual rotating wheel 28, the sleeve assembly 21, and the front support 18 follow the stretchable tube 16 to retract.

In summary, the actuator having a manual rotating mechanism and an anti-pinch mechanism of the present invention can achieve the expected objectives and overcome the disadvantages of the existing techniques. Also, it is novel, useful, and non-obvious to be patentable. Please examine the application carefully and grant it as a formal patent for protecting the rights of the inventor.

What is claimed is:

1. An actuator having a manual rotating mechanism and an anti-pinch mechanism, comprising:
   an actuating body having a leadscrew, a stretchable tube screwed to the leadscrew, and a front support;
   a manual rotating mechanism having a sleeve assembly and a manual rotating wheel, wherein the sleeve assembly has a central shaft, a circular body surrounding the central shaft, and a connecting plate connected between the central shaft and the circular body, wherein the front support is connected to one end of the central shaft, wherein the manual rotating wheel is sleeved between the sleeve assembly and the front support and is operationally engaged with the circular body or the front support; and an anti-pinch mechanism having a clutch wheel which is fixed to an end of the stretchable tube and is movably sleeved around the other end of the central shaft, wherein when the stretchable tube is blocked during a retraction stroke, the clutch wheel is detached from the connecting plate such that the clutch wheel follows the stretchable tube to idle.

2. The actuator having a manual rotating mechanism and an anti-pinch mechanism according to claim 1, wherein the connecting plate is provided with a driven portion, wherein the clutch wheel is provided with an actuating portion locked into the driven portion.

3. The actuator having a manual rotating mechanism and an anti-pinch mechanism according to claim 2, wherein the driven portion has a plurality of protruding teeth disposed radially, wherein the actuating portion has a plurality of straight teeth disposed radially.

4. The actuator having a manual rotating mechanism and an anti-pinch mechanism according to claim 1, wherein the anti-pinch mechanism further comprises a stop ring, wherein the central shaft has a second shaft section, wherein the stop ring is sleeved around and fixed to the second shaft section, wherein a gap is formed between an end surface of the clutch wheel and an end surface of the stop ring.

5. The actuator having a manual rotating mechanism and an anti-pinch mechanism according to claim 1, wherein the manual rotating mechanism further comprises a helical spring, wherein the circular body extends to form a stop annular portion, wherein the helical spring is sleeved around the external perimeter of the circular body and is clamped flexibly at both ends thereof between the manual rotating wheel and the stop annular portion.

6. The actuator having a manual rotating mechanism and an anti-pinch mechanism according to claim 5, wherein the manual rotating mechanism further comprises a radial bearing, wherein the central shaft has a first shaft section, wherein the radial bearing is clamped between the first shaft section and the front support.

7. The actuator having a manual rotating mechanism and an anti-pinch mechanism according to claim 6, wherein the manual rotating mechanism further comprises a thrust bearing which is sleeved on the first shaft section and is clamped between the front support and the connecting plate.

8. The actuator having a manual rotating mechanism and an anti-pinch mechanism according to claim 1, wherein the central shaft comprises a first shaft section and a second shaft section, wherein the front support is connected to the first shaft section, wherein the clutch wheel is sleeved to the second shaft section.

9. The actuator having a manual rotating mechanism and an anti-pinch mechanism according to claim 1, wherein a plurality of keyseats are disposed on the outer surface of the circular body, wherein a plurality of protrusions are spaced on the inner wall surface of the manual rotating wheel, wherein the protrusions are individually disposed corresponding to the respective keyseats.

10. The actuator having a manual rotating mechanism and an anti-pinch mechanism according to claim 1, wherein a plurality of key grooves are disposed at an end of the front support facing the manual rotating wheel, wherein a plurality of protrusions are spaced on the inner wall surface of the manual rotating wheel, wherein the protrusions are individually disposed corresponding to the respective key grooves.

* * * * *